US012623628B1

(12) United States Patent
Parenti

(10) Patent No.: US 12,623,628 B1
(45) Date of Patent: May 12, 2026

(54) ROTATING LICENSE PLATE AND REGISTRATION STICKER TAG SECURITY LOCKING DEVICE

(71) Applicant: Steve Parenti, Newark, CA (US)

(72) Inventor: Steve Parenti, Newark, CA (US)

( * ) Notice: Subject to any disclaimer, the term of this patent is extended or adjusted under 35 U.S.C. 154(b) by 0 days.

(21) Appl. No.: 19/363,342

(22) Filed: Oct. 20, 2025

(51) Int. Cl.
*B60R 25/01* (2013.01)
*B60R 13/10* (2006.01)

(52) U.S. Cl.
CPC ............ *B60R 25/01* (2013.01); *B60R 13/105* (2013.01)

(58) Field of Classification Search
CPC .............................. B60R 25/01; B60R 13/105
See application file for complete search history.

(56) References Cited

U.S. PATENT DOCUMENTS

| | | | |
|---|---|---|---|
| 2,121,677 A * | 6/1938 | Anderson ............. | B60R 13/105 40/200 |
| 6,158,154 A * | 12/2000 | Parenti ................. | G09F 3/0347 40/200 |

| | | | |
|---|---|---|---|
| 6,305,107 B1 * | 10/2001 | Parenti ................. | B60R 13/105 40/201 |
| 6,385,876 B1 * | 5/2002 | Mc Kenzie ............ | B60R 13/10 40/201 |
| 7,836,618 B1 * | 11/2010 | Parenti ................. | B60R 13/105 40/201 |
| 2002/0078608 A1 * | 6/2002 | Paulhill ................ | B60R 13/105 40/201 |
| 2011/0185605 A1 * | 8/2011 | Parenti ................... | B60R 13/10 40/202 |

* cited by examiner

*Primary Examiner* — Gary C Hoge
(74) *Attorney, Agent, or Firm* — Karthik Murthy; Murthy Patent Law Inc.

(57) ABSTRACT

A rotating license plate and registration sticker tag security locking device ("locking device"), which has a renewal sticker theft prevention window locking device that is applicable for license plates which display such renewal stickers in an upper right corner of the license plates. The renewal sticker theft prevention window locking device has thick material, so as to prevent the burning of the sticker in the sun. There is a rod that connects the window locking device to a left cylinder of the locking device. This locks the license plate, preventing theft. The rod is bendable to make it easier for a user to take off the locking device and put on a new registration sticker each year. It also makes it easier to take off the locking device when the license plate has to be removed, because a user is selling their car or moving out of state.

19 Claims, 25 Drawing Sheets

ROTATING LICENSE PLATE AND REGISTRATION STICKER TAG SECURITY LOCKING DEVICE

FIELD OF THE INVENTION

The present invention relates to a rotating license plate and registration sticker tag security locking device. The locking device also allows removal and replacement of the registration sticker more easily.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients or properties such as concentration, reaction conditions, and so forth, used to describe and claim certain embodiments of the invention are to be understood as being modified in some instances by the term "about."

Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meanings of "a," "an," and "the" include plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

People need cars to travel, but numerous Americans have had their licenses taken away due to driving under the influence or other factors. Therefore, they need to use someone else's license plates or registration sticker in order to not immediately get pulled over while driving. License plates and sticker tags get stolen every day. Identity theft is on the rise, and one form of identity theft is stealing license plates. People also don't want to pay car registration renewal, and so they steal registration stickers.

Indeed, "theft of license plates is up in St. Louis" https://www.ksdk.com/article/news/local/as-seen-on-tv/st-louis-license-plate-registration-sticker-theft-what-to-do/63-c33e0305-9a1c-4d73-b9b1-e1223c672414 states KSDK, a St. Louis, Missouri news company. "Bay Area thieves are stealing license plates" https://www.sfchronicle.com/crime/article/stolen-license-plate-theft-dmv-20187844.php states the San Francisco Chronicle. "DC driver fights $16K in tickets after someone stole her license plate" https://www.nbcwashington.com/news/local/dc-driver-fighting-16k-in-tickets-after-someone-stole-her-license-plate/3966730/states the Channel 4 NBC news in Washington, DC. These stories indicate that theft of license plates is a widespread problem. They further indicate that a lost license plate could lead to more than just paying for a replacement, it could lead to paying a huge amount of tickets.

"Report: Lost or stolen registration stickers cost state $560K" https://www.wftv.com/news/local/report-lost-or-stolen-registration-stickers-cost-s/270943112/states WFTV channel 9 states in Florida. "Crook cuts off corner of license plate to steal sticker" https://gazette.com/2020/01/10/crook-cuts-off-corner-of-license-plate-to-steal-sticker-645e862e-33f5-11ea-b788-272d9b08b32c/states the Denver Gazette in Colorado. "What to do when your license plate sticker goes missing" https://www.thv11.com/article/news/crime/what-to-do-when-your-license-plate-sticker-goes-missing/91-189202450 states the THV 11 in Arkansas. These stories indicate that theft of registration stickers is a widespread problem.

There are also millions of disabled Americans who have a difficult time with mobility, and so need some level of flexibility in the products they handle. In fact, over 70 million Americans reported having a disability in 2022. These disabled people may lack flexibility in terms of the ability to move their hands.

SUMMARY

The present invention solves these issues, because the present invention locks the license plate and registration sticker, and utilizes a bendable movable rod in order to connect the lock. The present invention has thick material that helps the registration sticker to not melt from heat. The thick material also helps the device withstand rough driving conditions in which rocks and dirt might hit it. The lock prevents people from taking the license plate or registration sticker.

The thick material may be made of thick glass, polycarbonate, thick plastic or other such thick material. The invention has a cylinder barrel on a left side, a cylinder barrel on a right side, a rectangle with a cylinder lock on the right side, wherein the cylinder lock goes into the cylinder barrel on the right side, and a bendable rod that connects the left cylinder barrel and right cylinder barrel. A key can be used to lock the cylinder lock.

The bendable rod may be rectangular, such that it is rectangular throughout except on a right side where it becomes shaped like a smaller cylinder barrel, then becomes an even smaller cylinder barrel, then expands into a cylinder barrel of a size identical to the smaller cylinder barrel. The bendable rod locks into a semi-square hole on the left side. This deters the bendable rod from being pried open with a pry bar.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 17 is an oblique view of an upper right rectangle of a rotating license plate and registration sticker tag security locking device according to various embodiments of the present disclosure.

FIG. 21 is a bottom view of a bendable rod of a rotating license plate and registration sticker tag security locking device according to various embodiments of the present disclosure.

DETAILED DESCRIPTION

Various embodiments of the present disclosure relate to providing a rotating license plate and registration sticker tag security locking device. Any embodiment may be combined with any other embodiment or may be combined with multiple other embodiments.

FIGS. 1-7 show the present invention locked in use on a license plate.

FIGS. 8-15 show the left cylinder barrel of the present invention.

Figure 16:
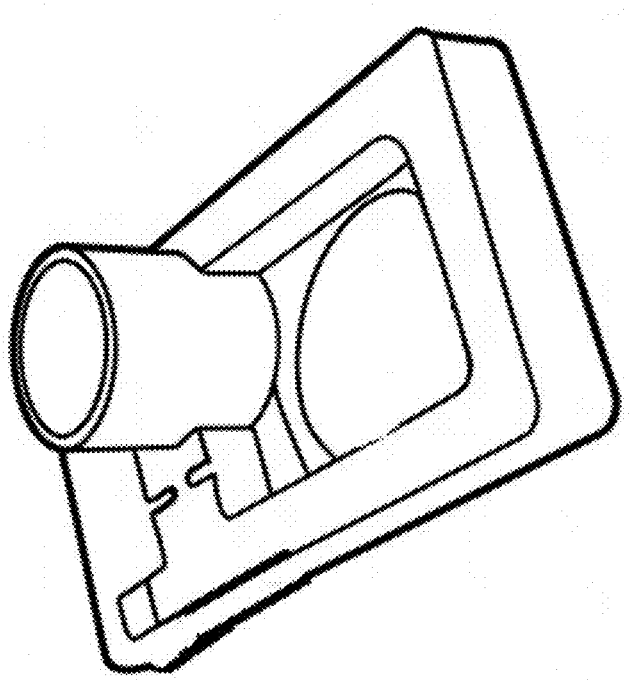
FIG. 16 is an oblique view of an upper right rectangle of a rotating license plate and registration sticker tag security locking device according to various embodiments of the present disclosure.
Figure 17:
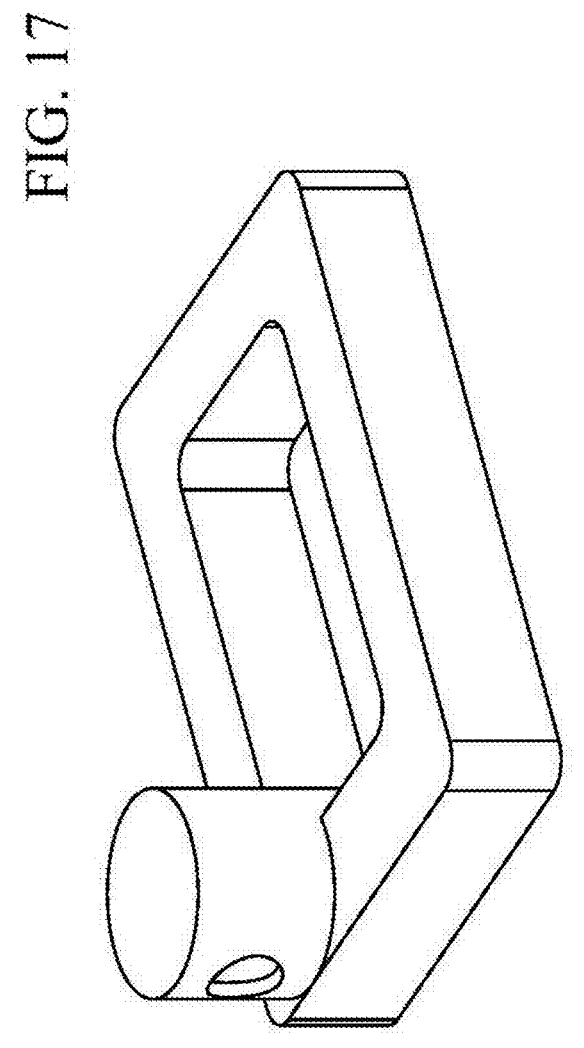
Figure 18:
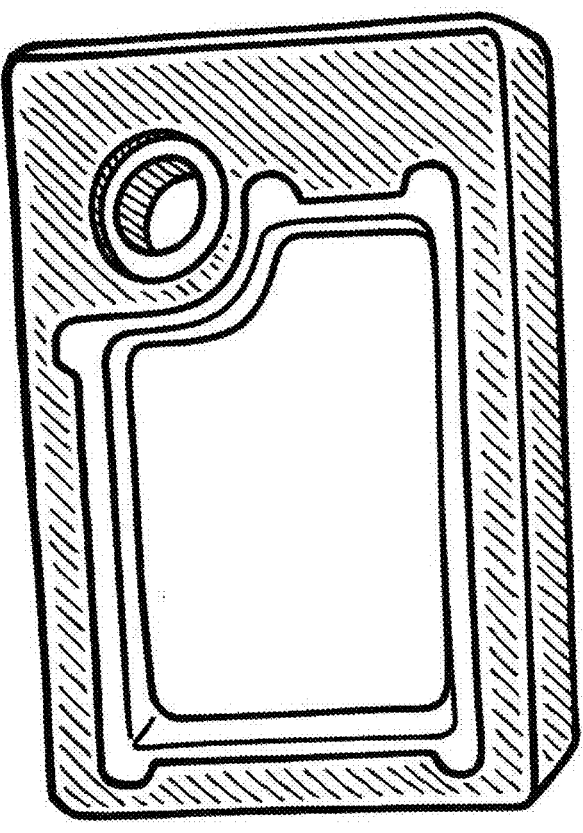
FIG. 18 is a bottom view of an upper right rectangle of a rotating license plate and registration sticker tag security locking device according to various embodiments of the present disclosure.

FIGS. 16-18 show the right rectangle of the present invention.

FIGS. 19-24 show the bendable rod of the present invention.

Figure 1:
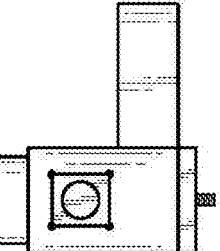
FIG. 1 is a left side view while locked of a rotating license plate and registration sticker tag security locking device according to various embodiments of the present disclosure.
Figure 2:
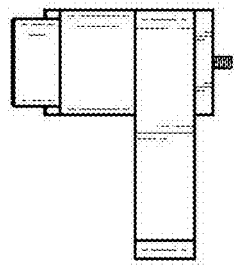
FIG. 2 is a right side view while locked of a rotating license plate and registration sticker tag security locking device according to various embodiments of the present disclosure.
Figure 3:
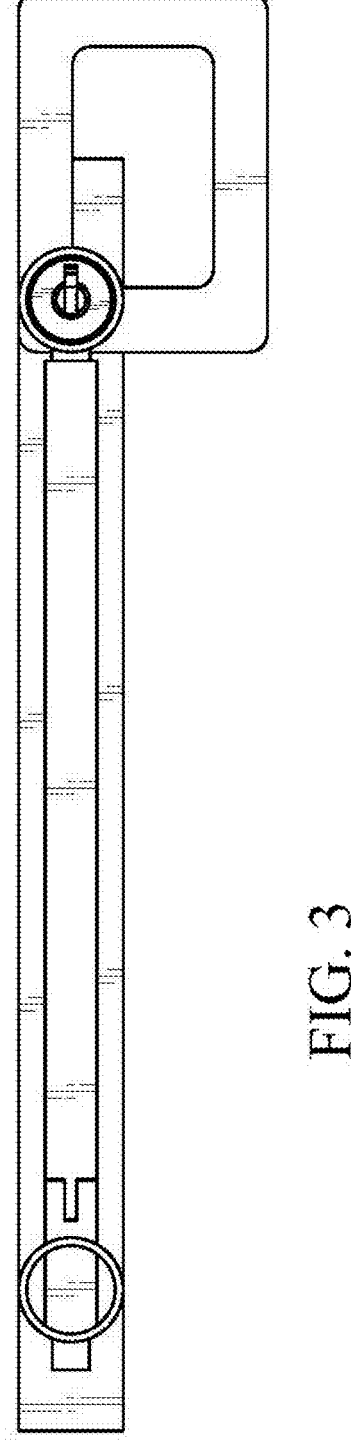
FIG. 3 is a top view of a rotating license plate and registration sticker tag security locking device according to various embodiments of the present disclosure.
Figure 4:
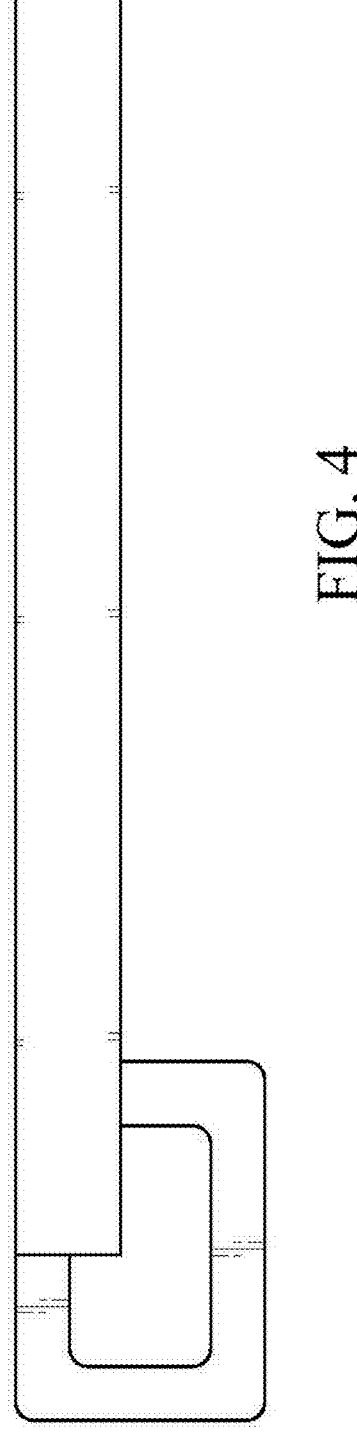
FIG. 4 is a bottom view of a rotating license plate and registration sticker tag security locking device according to various embodiments of the present disclosure.
Figure 5:
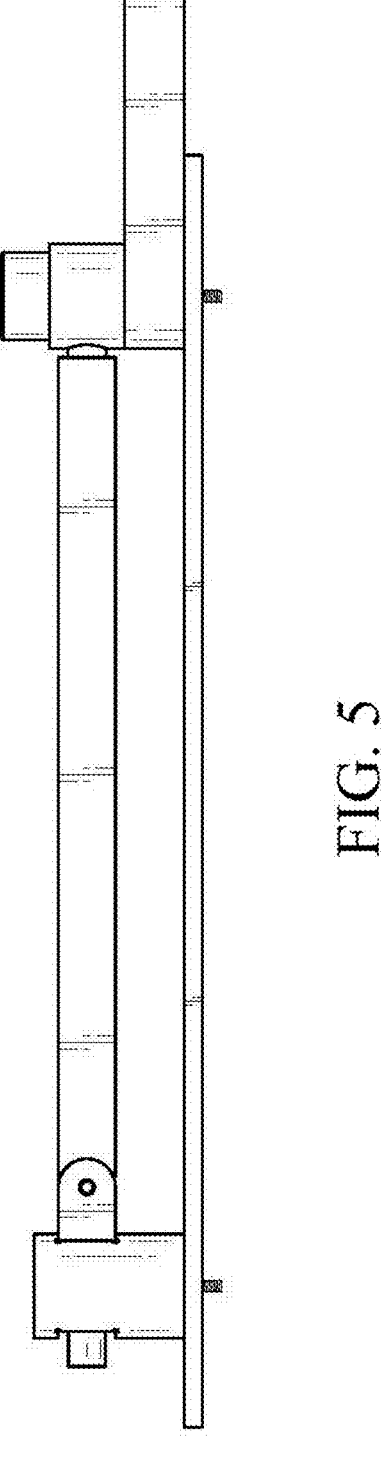
FIG. 5 is a front view of a rotating license plate and registration sticker tag security locking device according to various embodiments of the present disclosure.
Figure 6:
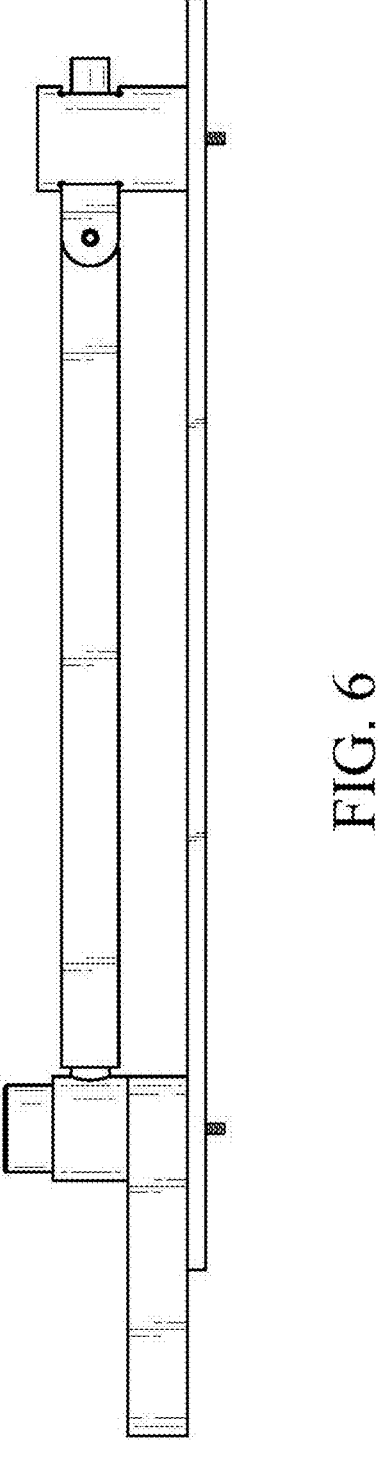
FIG. 6 is a rear view while view of a rotating license plate and registration sticker tag security locking device according to various embodiments of the present disclosure.
Figure 7:
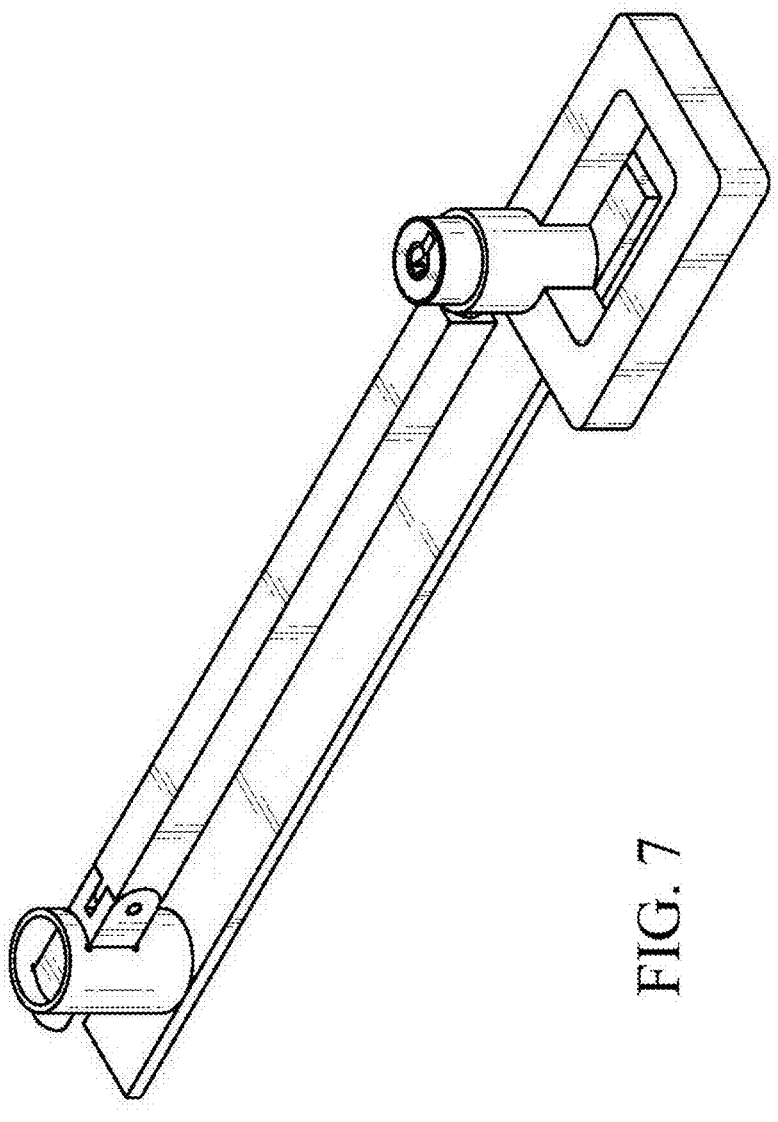
FIG. 7 is an oblique view of a rotating license plate and registration sticker tag security locking device according to various embodiments of the present disclosure.

FIG. 1 shows a left view of the invention when it is locked. A square opening for the bendable rod is shown, and the bendable rod goes through it. FIG. 2 shows a right view of the invention when it is locked. The area protecting the registration sticker can be seen, as well as the cylindrical lock. FIG. 3 shows a top view of the invention when it is locked. The bendable rod goes through the square holes in the left cylinder barrel on the left. Then on the right, the bendable rod goes into the right cylinder barrel and into the cylindrical lock. Then the cylindrical lock is turned with the key to lock it into place, thus preventing anyone from unscrewing the license plate below or from taking the registration sticker. FIG. 4 show s a bottom view of the invention when locked. FIG. 5 shows a front view of the invention when locked. FIG. 6 shows a rear view of the invention when locked. FIG. 7 shows an oblique view of the invention.

Figure 8:
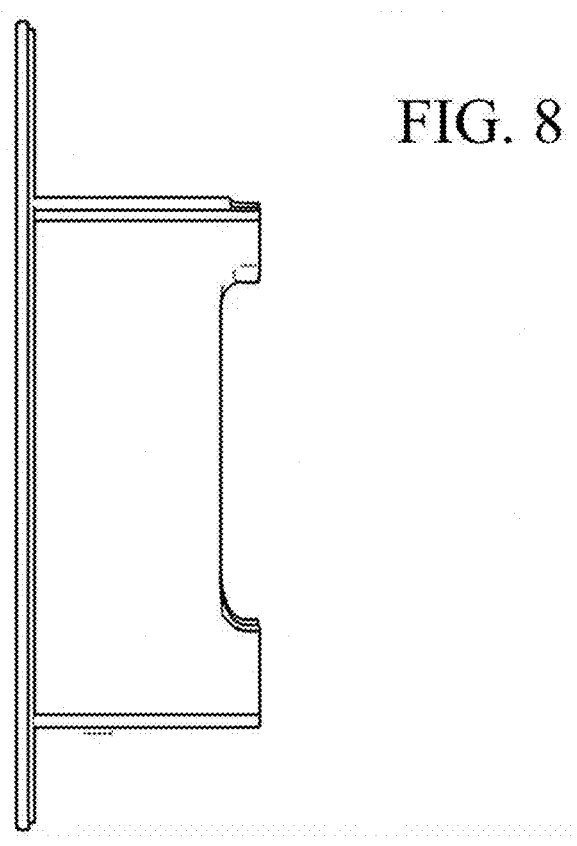
FIG. 8 is a left side view of a left cylinder barrel of a rotating license plate and registration sticker tag security locking device according to various embodiments of the present disclosure.
Figure 9:
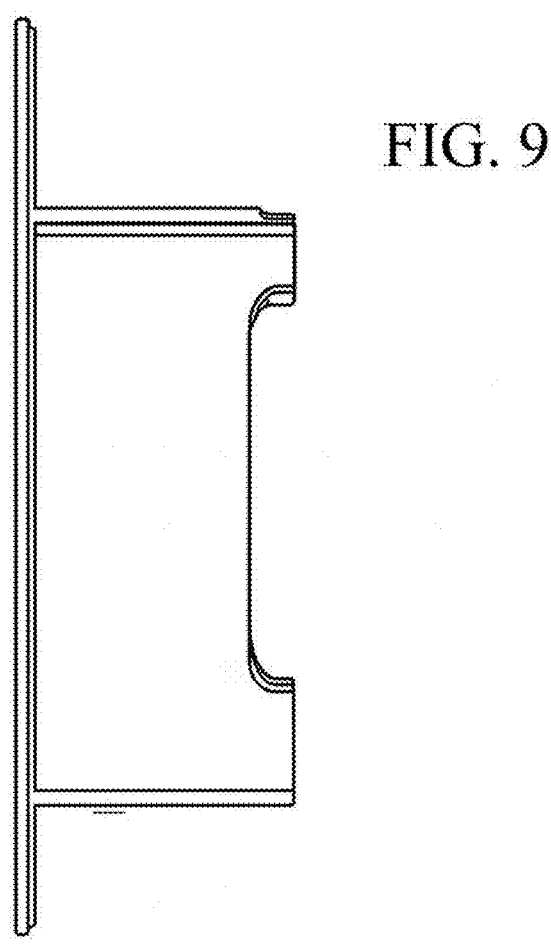
FIG. 9 is a right side view of a left cylinder barrel of a rotating license plate and registration sticker tag security locking device according to various embodiments of the present disclosure.
Figure 10:
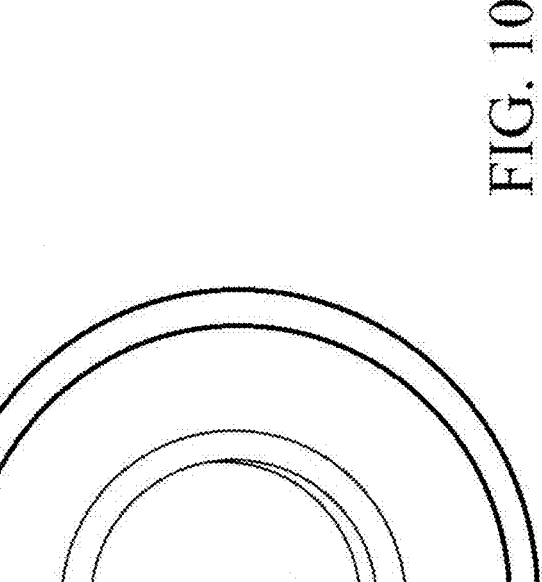
FIG. 10 is a top view of a left cylinder barrel of a rotating license plate and registration sticker tag security locking device according to various embodiments of the present disclosure.
Figure 11:
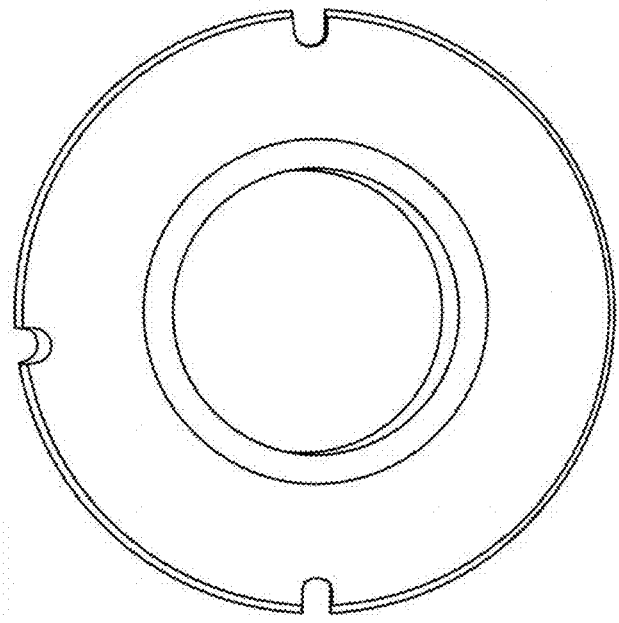
FIG. 11 is a bottom view of a left cylinder barrel of a rotating license plate and registration sticker tag security locking device according to various embodiments of the present disclosure.
Figure 12:
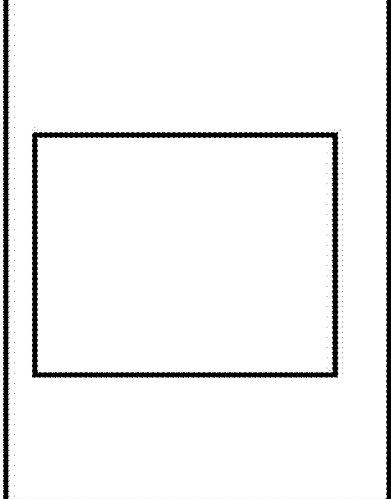
FIG. 12 is a front view of a left cylinder barrel of a rotating license plate and registration sticker tag security locking device according to various embodiments of the present disclosure.
Figure 13:
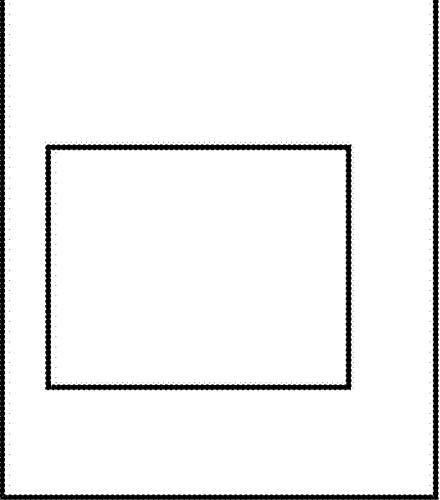
FIG. 13 is a rear view a left cylinder barrel of a rotating license plate and registration sticker tag security locking device according to various embodiments of the present disclosure.
Figure 14:
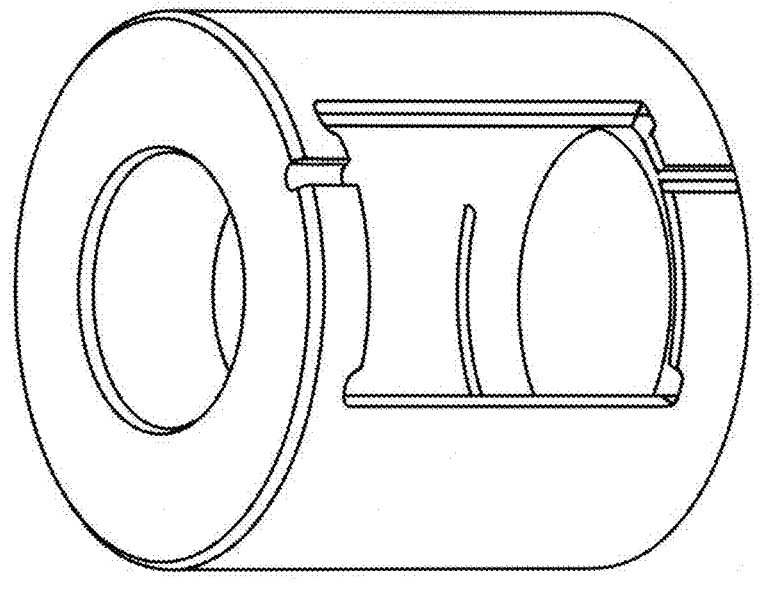
FIG. 14 is an oblique view of a left cylinder barrel of a rotating license plate and registration sticker tag security locking device according to various embodiments of the present disclosure.
Figure 15:
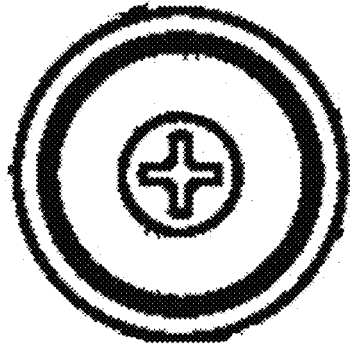
FIG. 15 is a top view of a left cylinder barrel with a bearing of a rotating license plate and registration sticker tag security locking device according to various embodiments of the present disclosure.

FIG. 8 shows a left view of the left cylinder barrel. FIG. 9 shows a right view of the left cylinder barrel. FIG. 10 shows a top view of the left cylinder barrel. FIG. 11 shows a bottom view of the left cylinder barrel. FIG. 12 shows a front view of the left cylinder barrel. FIG. 13 shows a rear view of the left cylinder barrel. FIG. 14 shows an oblique view of the left cylinder barrel. FIG. 15 shows the left cylinder barrel wherein a bearing is inside at the bottom of the left cylinder barrel. The bearing allows the left cylinder barrel to rotate 360 degrees in both directions, multiple times. Even though the bearing is held tight and in place using screws (or bolts) the left cylinder barrel itself is free to move without putting any pressure on the left cylinder barrel.

FIG. 17 shows an oblique view of the upper right rectangle. FIG. 18 shows a bottom view of the upper right rectangle.

Figure 19:
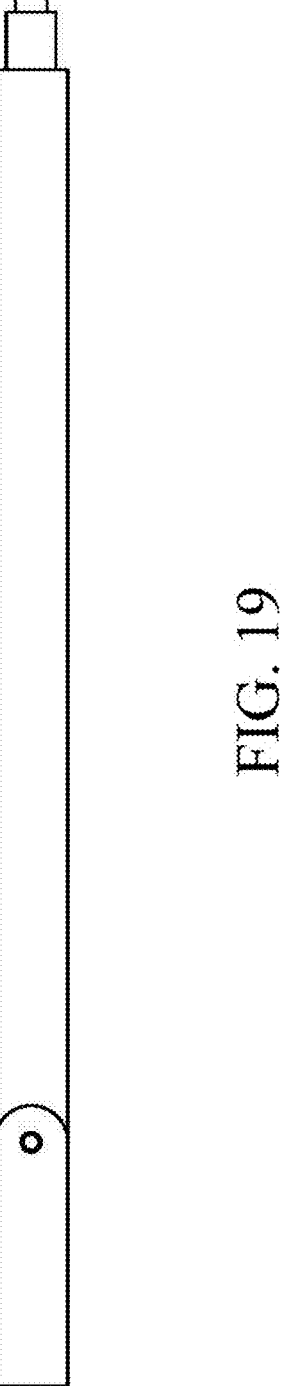
FIG. 19 is a front view of a bendable rod of a rotating license plate and registration sticker tag security locking device according to various embodiments of the present disclosure.
Figure 20:
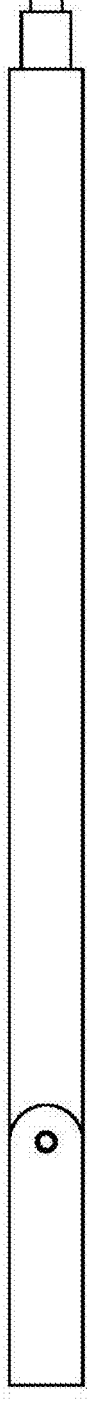
FIG. 20 is a rear view of a bendable rod of a rotating license plate and registration sticker tag security locking device according to various embodiments of the present disclosure.
Figure 21:
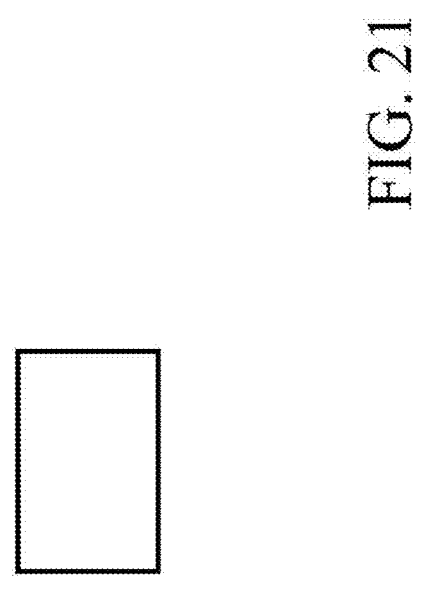
Figure 22:
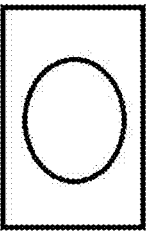
FIG. 22 is a top view thereof of a bendable rod of a of a rotating license plate and registration sticker tag security locking device according to various embodiments of the present disclosure.
Figure 23:
FIG. 23 is a right view of a bendable rod of a rotating license plate and registration sticker tag security locking device according to various embodiments of the present disclosure.
Figure 24:
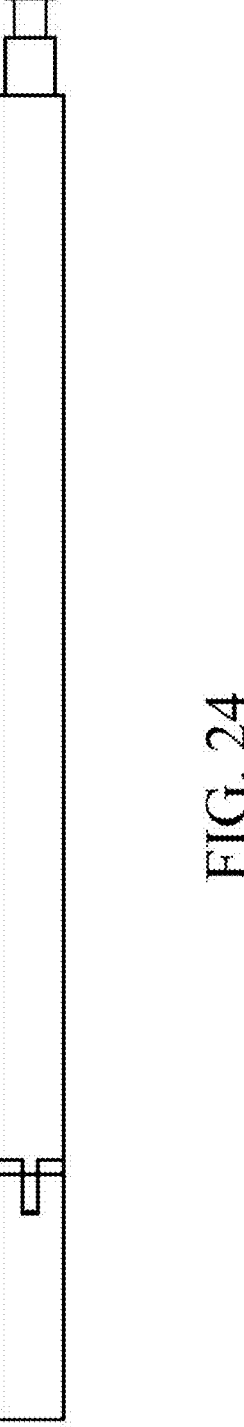
FIG. 24 is a left view of a bendable rod of a rotating license plate and registration sticker tag security locking device according to various embodiments of the present disclosure.

FIG. 19 shows a front view of the bendable rod. FIG. 20 shows a rear view of the bendable rod. FIG. 21 shows a bottom view of the bendable rod. FIG. 22 shows a top view of the bendable rod. FIG. 23 shows a right view of the bendable rod. FIG. 24 shows a left view of the bendable rod.

In one embodiment of the present invention, the material used to shield the registration sticker is made from polycarbonate, which has a combination of strength, light weight and impact resistance that can be helpful when being exposed to elements during driving, so as to prevent being broken.

In another embodiment of the present invention, the length of it while locked is 8 inches. The right rectangle is 2⅞ inches from left to right and 1⅞ inch from top to bottom.

In another embodiment of the present invention, FIG. 14 displays a semi-square in which the bendable rod can be inserted. This combination prevents a bar from prying open the lock, because the rod is held firmly in place by the semi-square on one side and a lock on the right rectangle on the other side.

In another embodiment of the present invention, the bendable rod can have writing on it for advertising purposes, because lots of people might see a license plate as a person drives around.

In another embodiment of the present invention, there is a flat metal bar below the bendable rod, wherein the metal flat bar is attached to the cylinders. When the flat metal bar is installed over a license plate there is not any space for a thief to insert a pry bar for unwanted removal of the license plate or registration sticker. In another embodiment of the present invention, the metal flat bar may be made of aluminum. In another embodiment of the present invention, the metal flat bar may be cylindrical instead of rectangular. In another embodiment of the present invention, the upper right rectangle is optional, such that the metal flat bar may connect with the cylindrical lock on the right side of the license plate in order to lock and protect the license plate, without protecting the registration sticker.

In another embodiment of the present invention, on one end of one of the cylinders is a locking pin for a cylindrical lock. A cylinder in the upper left uses a bearing. By using a bearing the cylinder in the upper left can rotate 360 degrees in both directions, multiple times. Even though the bearing is held tight and in place using screws (or bolts) the left cylinder barrel itself is free to move without putting any pressure on the left cylinder barrel.

The bendable rod is designed to swivel up and down or back and forth (depending on how it is installed). Once installed and bolted down a left cylinder barrel has a square hole on each side of the left cylinder barrel the holes are to insert the bendable rod into. This allows the bendable rod (to swivel in and out or up and down). On another side of the bendable rod is a right cylinder barrel which has a hole in which a cylindrical lock can be inserted, wherein the cylindrical lock locks the device. On one side of the bendable rod is a pin—a lock pin is attached permanently. The lock itself is inserted into a top side of the right cylinder barrel and then locked on by inserting the lock pin into the right cylinder barrel and the lock.

In another embodiment of the present invention, material in the right rectangle is made of material that does not cause bleaching in sunlight. If only glass is used to protect the registration sticker, then the registration sticker gets bleached in the sunlight. The material in the right rectangle can be made of polycarbonate, which is an exceptionally strong, clear thermoplastic with high impact resistance, making it a durable, lightweight alternative to glass. It's a versatile plastic that can be molded, tinted, and coated. Therefore, it can be placed in the right rectangle so as to protect the registration sticker. Another material that can be used in the right rectangle is acrylic. Acrylic is broad family of synthetic polymers derived from acrylic acid or methacrylic acid, which are used to create various materials including a transparent plastic (polymethyl methacrylate, or PMMA). Another material that can be used in the right rectangle is trivex. Trivex is a lightweight, high-strength lens material originally developed for military use, known for its exceptional optical clarity, durability, and built-in UV protection. Trivex also offers impact resistance, so as to protect the registration sticker in a car crash or fender bender. Another material that can be used in the right rectangle is Polyethylene terephthalate glycol ("PETG"), which is transparent and has impact resistance.

In another embodiment of the present invention, the bendable rod, cylinders and right rectangle can be made of stainless steel, carbon steel, black steel, aluminum, copper, enamel and ceramics such as solid ceramic and pyro ceramic. Other metals that are solid between 0 degrees Celsius and 110 degrees Celsius are also acceptable. This temperature range is based on temperatures of where humans might live, but if the invention is used in a place with more moderate temperature, then a metal that is only solid near that temperature may also be used.

In another embodiment of the present invention, there is a bearing on the bottom of the left cylinder barrel. This bearing allows the left cylinder barrel to rotate 360 degrees around, so the left cylinder barrel turns even though it looks like it is fixed. This bearing also allows the left cylinder barrel to rotate even after the left cylinder barrel has been tightened.

In another embodiment of the present invention, an anti-pry rod can be placed under the bendable rod that goes the same distance from left to right as the bendable rod. The anti-pry rod is rectangular, because it has no need to fit into the cylindrical lock in the right cylinder barrel nor the square holes of the left cylinder barrel. The anti-pry rod may be attached to the bendable rod, or may be attached to the license plate, whichever is more convenient for the user. The anti-pry rod prevents a thief from using a pry bar to pry the bendable rod off, because the anti-pry rod would be in the thief's way. The anti-pry rod may be made of any of the materials that the bendable rod may be made of, including: aluminum, thick glass, polycarbonate, thick plastic, acrylic, PMMA, Trivex, PETG or other such thick material.

In another embodiment of the present invention, a rotating license plate and registration sticker tag security locking device, comprising: cylinder barrels at left and right edges of the device (a "left cylinder barrel" and a "right cylinder barrel"); a renewal sticker theft prevention window at the right edge of the device; wherein the renewal sticker theft prevention window is made of transparent and hard material; a locking device that is applicable for license plates which display such renewal stickers in an upper right corner of a license plate; a bendable rod that bends at a joint, but does not bend once the device is locked; wherein the bendable rod is made of some type of metal; wherein the cylinder barrels are made of some type of metal; wherein the left cylinder barrel has square shaped holes on opposite vertical sides; wherein the right cylinder barrel can fit a cylindrical lock; wherein the cylindrical lock can be inserted from on top of the right cylinder barrel; wherein the cylindrical lock can be opened or locked with a key; wherein a screw goes through the left cylinder barrel, through the license plate and into the car; wherein another screw goes through the right cylinder barrel, through the license plate and into the car; wherein the bendable rod goes through square holes in the left cylinder barrel; wherein the bendable rod goes through a circular hole in the right cylinder barrel and into the cylindrical lock; and wherein when a key turns the cylindrical lock to lock it, then the bendable rod cannot be removed from either the left cylinder barrel or the right cylinder barrel, ensuring that a license plate and registration sticker will not be stolen.

In another embodiment of the present invention, a rotating license plate and registration sticker tag security locking device, comprising: cylinder barrels at left and right edges of the device; a renewal sticker theft prevention window at the right edge of the device; wherein the renewal sticker theft prevention window is made of transparent and hard material; a locking device that is applicable for license plates which display such renewal stickers in an upper right corner of a license plate; a bendable rod that bends at a joint, but does not bend once the device is locked; wherein the bendable rod is made of some type of metal; wherein the cylinder barrels are made of some type of metal; wherein the left cylinder barrel has square shaped holes on opposite vertical sides; wherein the right cylinder barrel can fit a cylindrical lock; wherein the cylindrical lock can be inserted from on top of the right cylinder barrel; wherein the cylindrical lock can be opened or locked with a key; wherein under the cylinder barrel at the left edge of the device is a bearing; wherein the bearing is fixed in place such that the cylinder barrel at the left edge of the device is able to rotate 360 degrees in either direction multiple times without coming loose; wherein a right side of the bendable rod inserts into the cylindrical lock when the cylindrical lock is placed in the right cylinder barrel; wherein the right side of the bendable rod is shaped like a smaller cylinder barrel, then becomes an even smaller cylinder barrel, then expands into a cylinder barrel of a size identical to the smaller cylinder barrel; wherein the left side of the bendable rod is shaped like a square in order to go through the square shaped holes on the left cylinder barrel; wherein a screw goes through the left cylinder barrel, through the license plate and into the car; wherein another screw goes through the right cylinder barrel, through the license plate and into the car; wherein the bendable rod goes through square holes in the left cylinder barrel; wherein the bendable rod goes through a circular hole in the right cylinder barrel and into the cylindrical lock; and wherein when a key turns the cylindrical lock to lock it, then the bendable rod cannot be removed from either the left cylinder barrel or the right cylinder barrel, ensuring that a license plate and registration sticker will not be stolen.

In another embodiment of the present invention, a rotating license plate security locking device, comprising: cylinder barrels at left and right edges of the device; a bendable rod that bends at a joint, but does not bend once the device is locked; wherein the bendable rod is made of some type of metal; wherein the cylinder barrels are made of some type of metal; wherein the left cylinder barrel has square shaped holes on opposite vertical sides; wherein the right cylinder barrel can fit a cylindrical lock; wherein the cylindrical lock can be inserted from on top of the right cylinder barrel; wherein the cylindrical lock can be opened or locked with a key; wherein under the cylinder barrel at the left edge of the device is a bearing; wherein the bearing is fixed in place such that the cylinder barrel at the left edge of the device is able to rotate 360 degrees in either direction multiple times without coming loose; wherein a right side of the bendable rod inserts into the cylindrical lock when the cylindrical lock is placed in the right cylinder barrel; wherein the right side of the bendable rod is shaped like a smaller cylinder barrel, then becomes an even smaller cylinder barrel, then expands into a cylinder barrel of a size identical to the smaller cylinder barrel; wherein the left side of the bendable rod is shaped like a square in order to go through the square shaped holes on the left cylinder barrel; wherein a screw goes through the left cylinder barrel, through the license plate and into the car; wherein another screw goes through the right cylinder barrel, through the license plate and into the car; wherein the bendable rod goes through square holes in the left cylinder barrel; wherein the bendable rod goes through a circular hole in the right cylinder barrel and into the cylindrical lock; and wherein when a key turns the cylindrical lock to lock it, then the bendable rod cannot be removed from either the left cylinder barrel or the right cylinder barrel, ensuring that a license plate will not be stolen.

Figure 25:
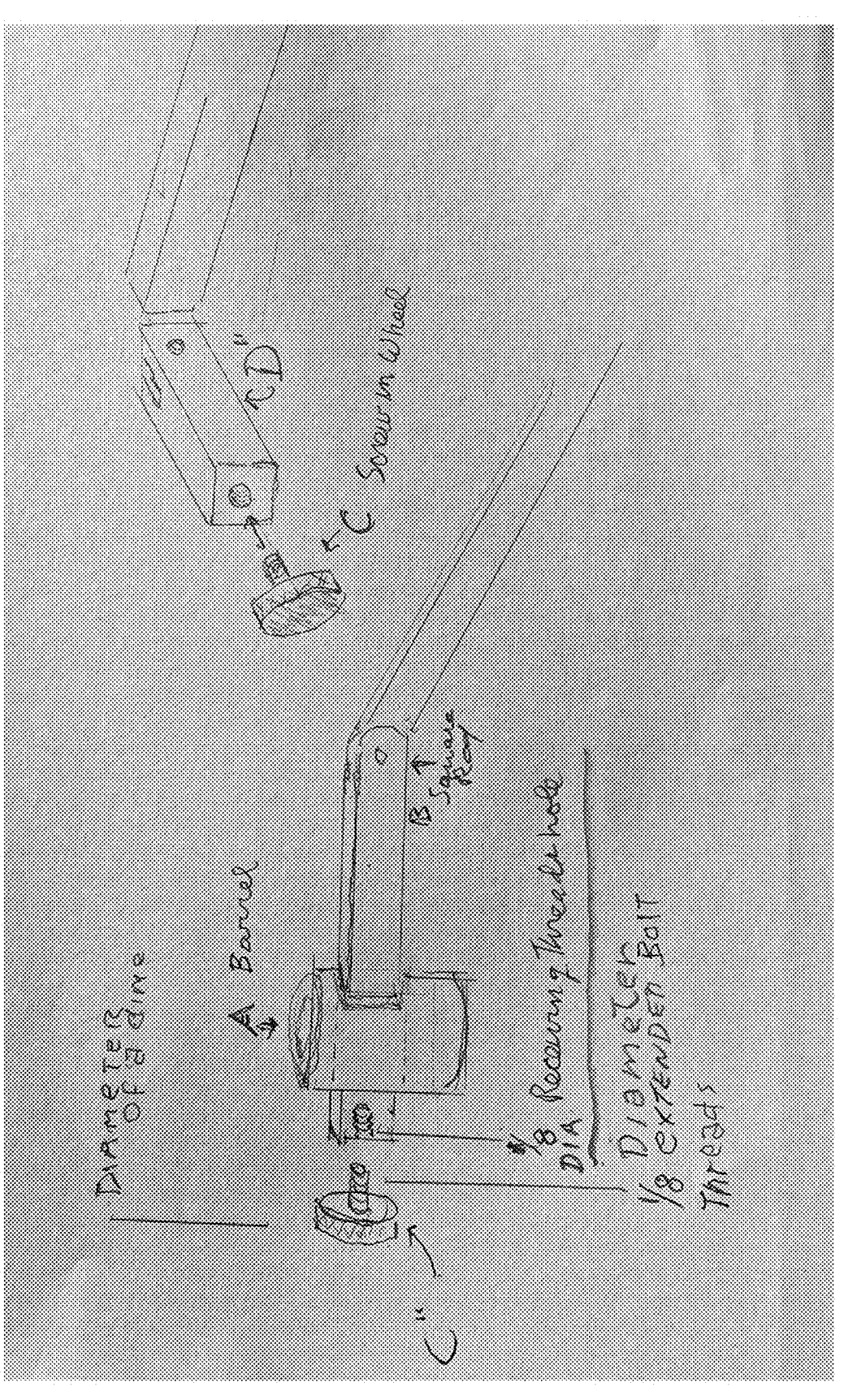
FIG. 25 is a left view of a bendable rod of a rotating license plate and registration sticker tag security locking device according to various embodiments of the present disclosure.

In another embodiment of the present invention, as displayed in FIG. 25, on a left side of the left cylinder barrel the bendable rod has a hole on its left side, which is a receiving threads hole. This receiving threads hole is deep enough for a screw to go in. The receiving threads hole is ⅛ inch in diameter. There is a screw-in wheel, which has a screw that is ⅛ inch in diameter attached to it, so that the screw can be screwed into the receiving threads hole. The screw-in wheel will prevent the bendable rod from exiting either barrel so the bendable rod does not fall out until the screw-in wheel is removed or unscrewed. This will have no effect on the ability of the left cylinder barrel to rotate freely. The steps to install and use the screw-in wheel are:

1. Install barrel on to license plate hole (be sure bearing is inside barrel)
2. Install square bar into barrel
3. Screw C" into bendable rod D"

C" will is longer diameter than D". This length is just enough to keep D" from exiting barrel A". C is the very last part that will be installed after all other parts have been installed.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A rotating license plate and registration sticker tag security locking device, comprising:

cylinder barrels at left and right edges of the device, including a left cylinder barrel and a right cylinder barrel;

a renewal sticker theft prevention window at the right edge of the device;

wherein the renewal sticker theft prevention window is made of transparent and hard material;

the locking device that is applicable for license plates which display such renewal stickers in an upper right corner of a license plate;

a bendable rod that bends at a joint, but does not bend once the device is locked;

wherein the bendable rod is made of some type of metal;

wherein the cylinder barrels are made of some type of metal;

wherein the left cylinder barrel has square shaped holes on opposite vertical sides;

wherein the right cylinder barrel can fit a cylindrical lock;

wherein the cylindrical lock can be inserted from on top of the right cylinder barrel;

wherein the cylindrical lock can be opened or locked with a key;

wherein a screw goes through the left cylinder barrel, through the license plate and into the car;

wherein another screw goes through the right cylinder barrel, through the license plate and into the car;

wherein the bendable rod goes through square holes in the left cylinder barrel;

wherein the bendable rod goes through a circular hole in the right cylinder barrel and into the cylindrical lock; and wherein when a key turns the cylindrical lock to lock it, then the bendable rod cannot be removed from either the left cylinder barrel or the right cylinder barrel, ensuring that a license plate and registration sticker will not be stolen.

2. The locking device of claim 1, wherein the renewal sticker theft prevention window is made of polycarbonate.

3. The locking device of claim 1, wherein the renewal sticker theft prevention window is made of acrylic.

4. The locking device of claim 1, wherein the renewal sticker theft prevention window is made of polymethyl methacrylate.

5. The locking device of claim 1, wherein the renewal sticker theft prevention window is made of Trivex.

6. The locking device of claim 1, wherein the renewal sticker theft prevention window is made of Polyethylene terephthalate glycol.

7. The locking device of claim 1, wherein the bendable rod and cylinder barrels are made of stainless steel.

8. The locking device of claim 1, wherein the bendable rod and cylinder barrels are made of any of the following: stainless steel or aluminum.

9. The locking device of claim 1, wherein the bendable rod is rectangular except on a right side where it is shaped so as to be inserted into the cylindrical lock.

10. The locking device of claim 1, wherein the bendable rod is cylindrical except on a right side where it is shaped so as to be inserted into the cylindrical lock.

11. The locking device of claim 1, further comprising:

wherein the device while locked has a length of 8 inches;

wherein the right rectangle is 2⅞ inches from left to right and 1⅞ inch from top to bottom.

12. The locking device of claim 1, further comprising:

wherein under the left cylinder barrel has a bearing inside and at its bottom;

wherein the bearing is fixed in place such that the left cylinder barrel is able to rotate 360 degrees in either direction multiple times without coming loose.

13. The locking device of claim 1, further comprising:

wherein the bendable rod has a hole on the bendable rod's left side;

wherein the hole is ⅛ inch in diameter;

wherein a screw-in wheel has a screw attached, wherein the screw is ⅛ inch diameter;

wherein the screw goes into the hole on the bendable rod's left side;

wherein the screw-in wheel prevents the bendable rod from falling out when the screw is screwed in and when the locking device is locked; and wherein the left cylinder barrel can still rotate.

14. A rotating license plate and registration sticker tag security locking device, comprising:

cylinder barrels at left and right edges of the device;

a renewal sticker theft prevention window at the right edge of the device;

wherein the renewal sticker theft prevention window is made of transparent and hard material;

the locking device that is applicable for license plates which display such renewal stickers in an upper right corner of a license plate;

a bendable rod that bends at a joint, but does not bend once the device is locked;

wherein the bendable rod is made of some type of metal;

wherein the cylinder barrels are made of some type of metal;

wherein the left cylinder barrel has square shaped holes on opposite vertical sides;

wherein the right cylinder barrel can fit a cylindrical lock;

wherein the cylindrical lock can be inserted from on top of the right cylinder barrel;

wherein the cylindrical lock can be opened or locked with a key;

wherein under the cylinder barrel at the left edge of the device is a bearing;

wherein the bearing is fixed in place such that the cylinder barrel at the left edge of the device is able to rotate 360 degrees in either direction multiple times without coming loose;

wherein a right side of the bendable rod inserts into the cylindrical lock when the cylindrical lock is placed in the right cylinder barrel;

wherein the right side of the bendable rod is shaped like a smaller cylinder barrel, then becomes an even smaller cylinder barrel, then expands into a cylinder barrel of a size identical to the smaller cylinder barrel;

wherein the left side of the bendable rod is shaped like a square in order to go through the square shaped holes on the left cylinder barrel;

wherein a screw goes through the left cylinder barrel, through the license plate and into the car;

wherein another screw goes through the right cylinder barrel, through the license plate and into the car;

wherein the bendable rod goes through the square holes in the left cylinder barrel;

wherein the bendable rod goes through a circular hole in the right cylinder barrel and into the cylindrical lock; and wherein when a key turns the cylindrical lock to lock it, then the bendable rod cannot be removed from either the left cylinder barrel or the right cylinder barrel, ensuring that a license plate and registration sticker will not be stolen.

15. The locking device of claim 14, further comprising:

wherein the device while locked has a length of 8 inches;

wherein the right rectangle is 2⅞ inches from left to right and 1⅞ inch from top to bottom.

16. The locking device of claim 14, further comprising:

wherein the bendable rod has a hole on the bendable rod's left side;

wherein the hole is ⅛ inch in diameter;

wherein a screw-in wheel has a screw attached, wherein the screw is ⅛ inch diameter;

wherein the screw goes into the hole on the bendable rod's left side;

wherein the screw-in wheel prevents the bendable rod from falling out when the screw is screwed in and when the locking device is locked; and wherein the left cylinder barrel can still rotate.

17. A rotating license plate security locking device, comprising:

cylinder barrels at left and right edges of the device;

a bendable rod that bends at a joint, but does not bend once the device is locked;

wherein the bendable rod is made of some type of metal;

wherein the cylinder barrels are made of some type of metal;

wherein the left cylinder barrel has square shaped holes on opposite vertical sides;

wherein the right cylinder barrel can fit a cylindrical lock;

wherein the cylindrical lock can be inserted from on top of the right cylinder barrel;

wherein the cylindrical lock can be opened or locked with a key;

wherein under the cylinder barrel at the left edge of the device is a bearing;

wherein the bearing is fixed in place such that the cylinder barrel at the left edge of the device is able to rotate 360 degrees in either direction multiple times without coming loose;

wherein a right side of the bendable rod inserts into the cylindrical lock when the cylindrical lock is placed in the right cylinder barrel;

wherein the right side of the bendable rod is shaped like a smaller cylinder barrel, then becomes an even smaller cylinder barrel, then expands into a cylinder barrel of a size identical to the smaller cylinder barrel;

wherein the left side of the bendable rod is shaped like a square in order to go through the square shaped holes on the left cylinder barrel;

wherein a screw goes through the left cylinder barrel, through the license plate and into the car;

wherein another screw goes through the right cylinder barrel, through the license plate and into the car;

wherein the bendable rod goes through the square holes in the left cylinder barrel;

wherein the bendable rod goes through a circular hole in the right cylinder barrel and into the cylindrical lock; and wherein when a key turns the cylindrical lock to lock it, then the bendable rod cannot be removed from either the left cylinder barrel or the right cylinder barrel, ensuring that a license plate will not be stolen.

18. The locking device of claim 17, wherein the bendable rod and cylinder barrels are made of any of the following: stainless steel or aluminum.

19. The locking device of claim 17, further comprising:

wherein the bendable rod has a hole on the bendable rod's left side;

wherein the hole is ⅛ inch in diameter;

wherein a screw-in wheel has a screw attached, wherein the screw is ⅛ inch diameter;

wherein the screw goes into the hole on the bendable rod's left side;

wherein the screw-in wheel prevents the bendable rod from falling out when the screw is screwed in and when the locking device is locked; and wherein the left cylinder barrel can still rotate.

* * * * *